United States Patent
Doisy et al.

(10) Patent No.: US 7,649,809 B2
(45) Date of Patent: Jan. 19, 2010

(54) METHOD FOR OPTIMIZING THE POWER SUPPLY FOR A TOWED LINEAR TRANSMIT ANTENNA FOR TRANSMITTING IN OMNIDIRECTIONAL MODE

(75) Inventors: Yves Doisy, Grasse Plascassier (FR); Louis Raillon, Cagnes sur Mer (FR)

(73) Assignee: Thales, Neuilly sur Seine (FR)

( * ) Notice: Subject to any disclaimer, the term of this patent is extended or adjusted under 35 U.S.C. 154(b) by 142 days.

(21) Appl. No.: 11/740,877

(22) Filed: Apr. 26, 2007

(65) Prior Publication Data

US 2008/0056069 A1   Mar. 6, 2008

(30) Foreign Application Priority Data

Apr. 26, 2006 (FR) .................................. 06 03729

(51) Int. Cl.
H04B 1/02 (2006.01)
(52) U.S. Cl. .................................... 367/138
(58) Field of Classification Search ............... 367/138, 367/154, 130, 106, 20
See application file for complete search history.

(56) References Cited

U.S. PATENT DOCUMENTS

| | | | |
|---|---|---|---|
| 3,135,944 A * | 6/1964 | Ehrlich | ........................ 367/153 |
| 5,101,383 A | 3/1992 | Doisy et al. | |
| 5,428,581 A | 6/1995 | Doisy et al. | |
| 6,072,423 A | 6/2000 | Doisy et al. | |
| 6,314,053 B1 | 11/2001 | Doisy et al. | |
| 6,901,029 B2 | 5/2005 | Raillon et al. | |
| 7,075,858 B2 | 7/2006 | Doisy et al. | |
| 7,286,443 B2 | 10/2007 | Doisy et al. | |
| 2008/0056069 A1 * | 3/2008 | Doisy et al. | ................. 367/138 |

FOREIGN PATENT DOCUMENTS

| | | |
|---|---|---|
| DE | 197 43 096 C 1 | 1/1999 |
| FR | 2 822 960 | 10/2002 |
| GB | 1 486 068 | 9/1977 |
| WO | 92/18878 | 10/1992 |
| WO | WO 92/18878 | 10/1992 |
| WO | 02/079806 A1 | 10/2002 |

* cited by examiner

*Primary Examiner*—Dan Pihulic
(74) *Attorney, Agent, or Firm*—Lowe Hauptman Ham & Berner, LLP (57) ABSTRACT

A method for achieving omnidirectional transmission using of a towed linear antenna of length L greater than the wavelength λ of the signal transmitted. The antenna has a plurality of P projectors. The spacing between projectors is substantially less than λ/2. The method includes applying, to each projector, a transmit signal coming from a common transmit signal. The common signal is assigned a delay based upon a calculation that includes a non-linear term as a function of the position of the projector in the antenna, thereby allowing the angular aperture of the transmission pattern to be modulated. the method permits sonar detection systems comprising transmit and receive antennas having substantially identical diameters, which thereby can be reeled onto the same winch without it being necessary to separate them.

20 Claims, 7 Drawing Sheets

METHOD FOR OPTIMIZING THE POWER SUPPLY FOR A TOWED LINEAR TRANSMIT ANTENNA FOR TRANSMITTING IN OMNIDIRECTIONAL MODE

RELATED APPLICATIONS

The present application is based on, and claims priority from, France Application Number 06 03729, filed Apr. 26, 2006, the disclosure of which is hereby incorporated by reference herein in its entirety.

FIELD OF THE INVENTION

The present invention relates to the field of transmission systems for very-low-frequency towed active sonars. These sonars are used by surface ships for underwater detection and have the function of protecting ships against underwater threats. The invention also relates to a method for ensuring omnidirectional transmission from a linear antenna comprising a plurality of elementary projectors by optimizing the power supply for the projectors and the signals to be transmitted.

BACKGROUND OF THE INVENTION

Prior Art

In order to ensure that a surface ship is protected, its sonar must be able to detect threats, mainly underwater craft, at long distance and in all directions in space. This detection must also be able to be implemented under varied environmental conditions.

The detection requirements mean that sonar systems operating at low frequency must be used, corresponding to long wavelengths of the order of one meter.

To obtain sufficient directivity, the dimensions of the receive antennas are commonly several tens of meters. Moreover, the nature of the profile of the speed of sound in water requires, under certain conditions, the transmit and receive antennas to be able to be immersed at a depth optimized for detection. This is in particular the case during the summer months when the speed-of-sound gradients in regions close to the surface are highly negative.

The combination of these requirements relating to the operating frequency, to the necessary dimensions of the receive antenna and to the capability of choosing the immersion depth of the system results, in existing systems or those under development, in the use for reception of towed linear antennas that can be reeled up, the deployment and recovery of which are relatively easy. The transmit function is itself achieved, by means of another, specific antenna incorporated into a towed body. This transmit antenna may be non-directional, and allow omnidirectional transmission to be achieved, or slightly directional and for example transmit over two to four sectors so as to cover the horizon.

In all cases, the use of this specific antenna for transmission generates various constraints. A first type of constraint concerns the implementation of the system and in particular the operations of deploying and recovering the towed body containing the transmit antenna, which operations require a specific system for placing it in the water and recovering it therefrom. Another type of constraint consists of the drag associated with the towed body containing the transmit antenna, the magnitude of which drag determines the size of the towing cable and consequently the weight of the system.

One solution for eliminating these constraints consists in producing a transmit antenna, which is again linear and reelable, and in configuring this antenna so as to make it capable of uniformly insonifying the entire space.

The French patent document published under the number 2 822 960 discloses a "Towed low-frequency underwater detection system" comprising a linear transmit antenna and a linear receive antenna, the two antennas having approximately the same diameter. In particular, the document describes a method for insonifying the entire space by means of forming a transmit channel operating in a rotating directional mode, called RDT mode, in which each projector is fed with the signal to be transmitted, which is assigned a delay that is a function of the average pointing direction of the channel. According to that document, the signal to be transmitted is furthermore assigned a delay allowing the transmit channel to be enlarged, said delay being defined by an adapted-phase or delay law, for example a law of the quadratic type. A similar signal is transmitted in succession in several directions by switching the delays so as to cover the entire space. Since the transmit sectors are wide, a much smaller number of sectors than the number of projectors is sufficient.

Such a system operating in directional or sectorial transmission, or in RDT mode, mainly has two types of drawback.

The first drawback is associated with the sectorial transmission mode which requires, as in the case of any antenna, each projector to be fed independently via a pair of supply conductors delivering the delayed signal to be transmitted. This results in a large number of pairs in the towing cable, in particular if it is desired to use a large number of projectors.

The second drawback is that, even using an RDT-type transmission mode, omnidirectional coverage is obtained by rotating the insonified sector.

The duration of transmission in each sector is reduced for a given total transmission time. The level is higher than in the case of omnidirectional transmission, but there is a degradation of the Doppler resolution in the case of transmission codes exploiting the Doppler effect, since Doppler resolution depends on the duration.

SUMMARY OF THE INVENTION

One object of the invention is to propose a solution making it possible to use a linear antenna to achieve a really omnidirectional transmission.

For this purpose, one subject of the invention is a method for achieving omnidirectional transmission by means of a towed linear antenna of length L consisting of a plurality of P projectors suitably spaced apart, as will be described later, over the length of the antenna, consisting in applying, to each projector, a signal coming from the common transmit signal to be transmitted that is assigned a delay whose value follows a law of variation as a function of the position of the projector in the antenna.

According to a preferred way of implementing the method according to the invention, on an antenna whose projectors are substantially equidistant apart and sufficiently close together, that is to say spaced apart by a distance substantially less than $\lambda/2$, the delay law applied to the signal as a function of the position x of the projector with respect to the centre of the antenna is a quadratic law of the form:

$$\tau(x) = \alpha x^2.$$

According to one particular way of implementing the method according to the invention, on an antenna whose projectors are substantially equidistant apart and sufficiently close together, the law of variation of the delay applied to the signal as a function of the position x of the projector with respect to the centre of the antenna is of the form:

$$\tau(x) = \pm \frac{1}{c}[|x| + L\ln(L - |x|)].$$

According to the invention, the delay $\tau'(x)$ applied to the signal is equal to the delay $\tau(x)$ modulo a period $T_0$ corresponding to the central frequency of the transmitted signal, the $\tau'(x)$ values being quantized over Q levels from $\tau_1$ to $\tau_Q$.

According to the invention, the projectors, the quantized values $\tau_i$ of the delay for which differ by $T_0/2$, are advantageously fed via the same pair of feed wires, by simply reversing the polarity of the feed wires, the number of pairs of feed wires needed thus being advantageously equal to Q/2.

In another way of implementing the method according to the invention, some of the central projectors are grouped together in pairs of adjacent projectors and the outermost projectors are grouped together in pairs of projectors that are symmetrical with respect to the centre of the antenna. The projectors constituting a pair are therefore fed with the same signal $\tau_i$. These groups advantageously make it possible to achieve either sectorial transmission, using only the central projectors, or omnidirectional transmission using all of the projectors.

Another subject of the invention is a linear antenna suitable for optimized implementation of the method according to the invention, for which the spacing of the projectors follows a non-linear law, which feature advantageously makes it possible to minimize the number of delays $\tau_i$ to be achieved, while optimizing the number of transducers fed with a signal assigned the same delay $\tau_i$.

Yet another subject of the invention is a method for achieving omnidirectional transmission in the horizontal plane by means of a towed linear antenna of length L, consisting of a plurality of P projectors, when this antenna is towed so as to be inclined between the horizontal and the vertical. According to this method, each projector is fed with a transmit signal coming from a common transmit signal to which a delay is applied, the value of said delay following a non-linear law as a function of the position of the projector in the antenna. According to the invention, this law is defined so as to obtain sectorized transmission with a sector of aperture such that the insonifying in the horizontal plane remains omnidirectional.

The essential advantage provided by the method according to the invention is that it allows omnidirectional transmission of the same signal over the entire duration of the transmission and not by successively insonifying the various sectors, this being obtained by means of a linear antenna comprising a succession of projectors distributed over the length of the antenna and fed by a small number of supply pairs, this number furthermore not depending on the number of projectors making up the antenna.

DESCRIPTION OF THE FIGURES

The features and advantages of the various aspects of the invention will become clearly apparent in the following description, which is associated with the appended figures.

DETAILED DESCRIPTION

Firstly, FIGS. 1 and 2 will be discussed.

As mentioned above, it is known from the prior art that a linear antenna of length L made up of several projectors may be used to insonify a sector in space. This transmission is achieved by feeding each projector with a signal coming from a common transmit signal to which a variable delay $\tau(x)$ is applied, the law of variation of which is a linear law as a function of the desired pointing bearing $\theta$ relative to the axis of the antenna. Consequently, the delay applied to a projector located at a distance x from the central point of the antenna has the general expression:

$$\tau(x) = \frac{x}{c}\cos(\theta) \qquad [1]$$

where c represents the speed of sound in water.

The method according to the invention consists firstly in applying, to the signal used to feed the projectors, a non-linear delay law $\tau(x)$, which is a function of the position x of the projector in question with respect to the centre of the antenna, the expression for which law varies as a function of the structure of the linear antenna in question.

Figure 1:
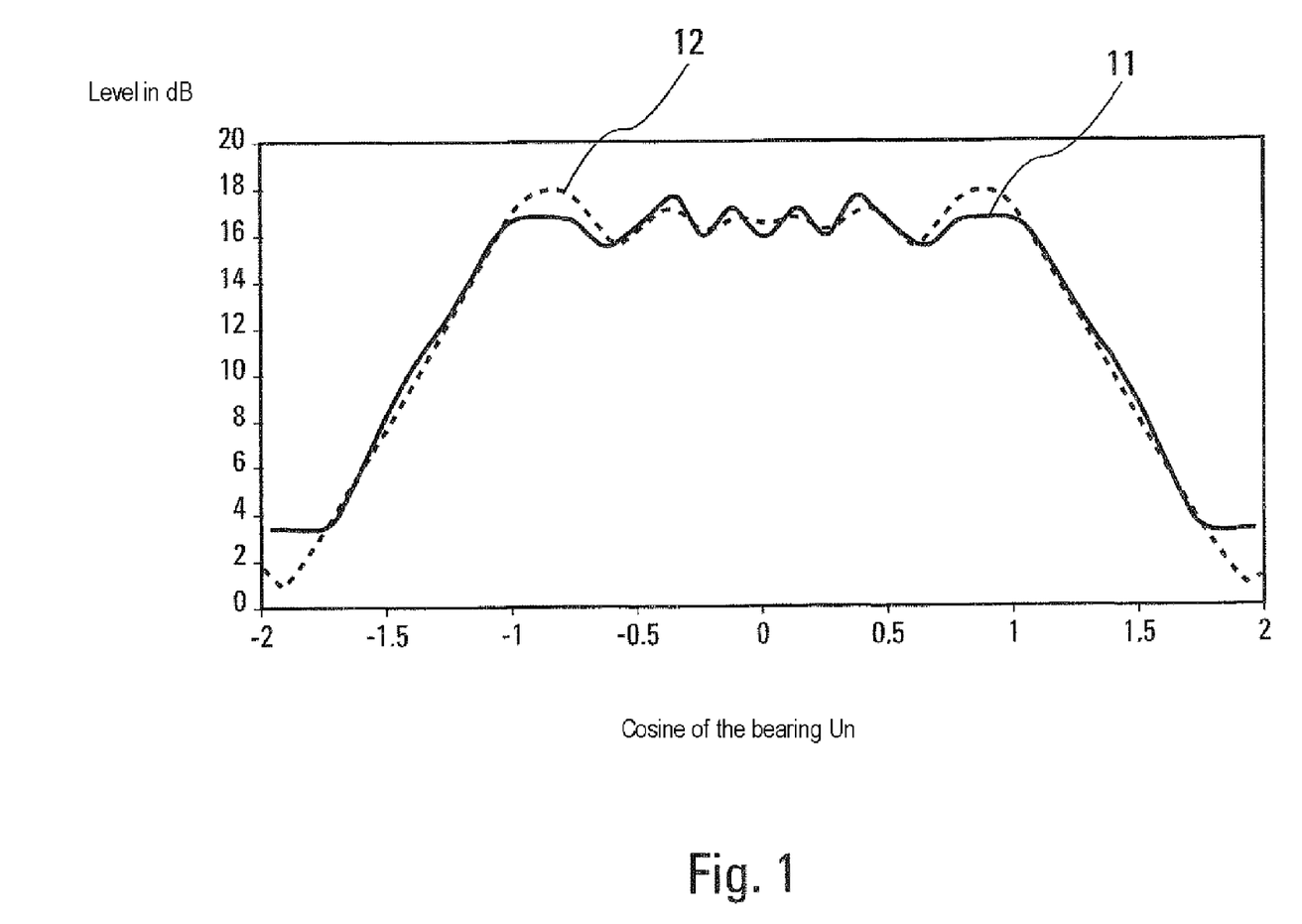
FIG. 1, the directivity patterns of an antenna comprising equispaced projectors distributed along the antenna, patterns obtained by applying to the transmission signal either a classical quadratic delay or the delay produced by the process of the invention, FIG. 2, the law of variation, as a function of the projector in question, of the delay $\tau(x)$ to be applied to the transmission reference signal, in order to obtain the pattern shown in solid line in FIG. 1

Thus, in the case of an antenna consisting of projectors equally distributed over its length, the transmission beam may be enlarged so as to obtain a directivity pattern such as that shown in curve 11, as the solid line, in FIG. 1, by superposing, on the linear delay law given by equation [1], a non-linear, for example quadratic, law $\tau(x)$ as a function of the position x of the projector with respect to the centre of the antenna. The general expression for this law is:

$$\tau(x) = \alpha x^2 \qquad [2]$$

in which $-\frac{L}{2} \le x \le \frac{L}{2}$.

The coefficient $\alpha$ is related here to the angular aperture of the transmission pattern that it is desired to obtain. In general, a coefficient $\alpha$ of the following form is chosen:

$$\alpha = \beta \times 2\pi/(\lambda L) \qquad [3]$$

where $\lambda$ is the wavelength and where $\beta$ represents a coefficient whose value lies within the [0, 1.5] interval, determining the angular aperture of the desired transmission pattern.

Curve 11 of FIG. 1 corresponds to the transmission pattern obtained with a linear antenna comprising thirty-two equidistant projectors and to the application to the transmit signal of a quadratic delay law $\tau(x)$ according to equation [2].

Figure 2:
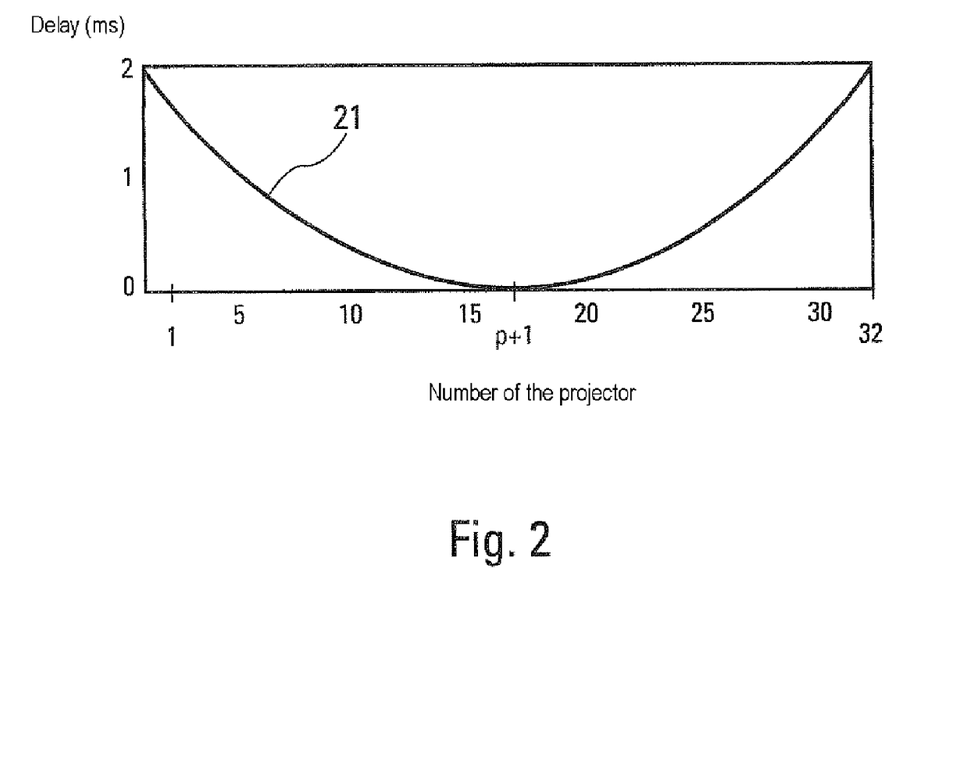

Curve 21 in FIG. 2 represents the law of variation, as a function of the projector in question, of the delay $\tau(x)$ to be applied to the common reference signal, corresponding to the middle of the antenna, in order to obtain the pattern 11 shown in FIG. 1. The law here is shown in the case of a linear antenna comprising thirty-two projectors equidistant apart.

Similarly, in the case of an antenna comprising distributed projectors with a variable pitch along the antenna, the transmission beam may be enlarged by superposing, on the linear delay law given by equation [1], a non-linear law $\tau(x)$, the expression for which, as a function of the position x of the projector with respect to the centre of the antenna, is given by the following equation:

$$\tau(x) = \pm \frac{1}{c}[|x| + L\ln(L - |x|)] \quad [4]$$

in which $-\frac{L}{2} \leq x \leq \frac{L}{2}$.

In the two cases mentioned above, an omnidirectional beam is obtained by applying the appropriate delay law on condition however that particular precautions are taken as regards the distribution of projectors along the antenna.

This is because it is known from the prior art that, in the case of an antenna comprising equispaced projectors with a constant pitch d(x), the directivity pattern shown as a function of the variable u=cos θ, θ being the angle between the direction in question and the direction of the transmitted beam (u=cos θ, which varies from −1 to +1), is a periodic pattern with a period equal to λ/d.

Therefore, to avoid aliasing that would result in prohibitive oscillations of the directivity pattern, the pitch d must satisfy, as is known, in the case of omnidirectional transmission, the following equation:

$$\frac{\lambda}{d} \geq 2 + U_t \Leftrightarrow d \leq \frac{\lambda}{2 + U_t} \quad [5]$$

where $U_t$ represents the transition band of the directivity pattern represented in u space.

This condition usually leads in the general case, for an antenna having equidistant projectors, to the use of projectors along the antenna with a pitch d slightly less than λ/2. However, in the case in which a delay law such as that described by equation [2] is used, the transition band $U_t$ behaves dimensionally as $\sqrt{\lambda/L}$, which means adopting a spacing with a value close to λ/4 to λ/3 for the distribution of the projectors, depending on the number of projectors in the antenna.

In the particular case of antennas having non-equidistant sensors for which a delay law such as that described by equation [4] is applied to the signal, the condition [5] applies to the outermost projectors of the antenna, which are the closest together. The transition band $U_t$ again behaves dimensionally as $\sqrt{\lambda/L}$, which means having, for the pitch d(x=L/2), a spacing with a value close to λ/4 to λ/3 depending on the number of projectors of the antenna.

This condition imposed on the spacing between projectors is an essential condition that has an influence on the structure of the antenna used and therefore on the effectiveness of the method according to the invention. This is because, if this projector spacing condition is not respected, the transmitted signal is no longer the same in all directions and is therefore no longer truly omnidirectional owing to the aliasing of the directivity pattern that results therefrom.

Figure 3:
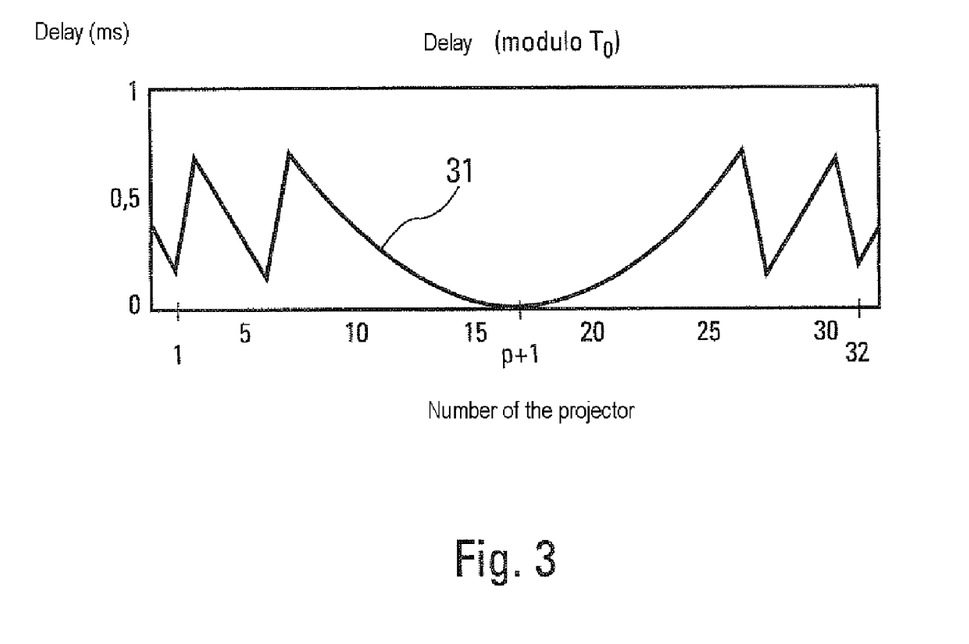
FIG. 3, an approximate for of the law of variation of the delay $\tau(x)$ shown in FIG. 2

Next, FIGS. 3 and 4 will be discussed.

Since the transmit signals used in active sonar being signals with a bandwidth B centred on a central frequency $F_0$, the method according to the invention consists secondly in approximating the applied delay law by its expression modulo $T_0 = 1/F_0$. Consequently, the delay applied to a projector, for example in the case of an antenna having equidistributed projectors, will be expressed as:

$$\tau'(x) = \alpha x^2 [\text{modulo } T_0] \quad [6]$$

This modulo $T_0$ delay law is more simply expressed in terms of a phase law applied to the signal in the form:

$$\phi(x) = 2\pi F_0 \tau(x) \quad [7]$$

In the case of a delay law $\tau(x)$ chosen to form channels, this approximation, called narrow-band approximation, is acceptable provided that the following condition, which is relatively constricting and links the bandwidth B of the signal to the antenna length L, is met:

$$B << c/L \quad [8]$$

where c represents the speed of sound in the propagation medium.

However, in the case of a delay law of the type corresponding to equation [2] or equation [4], which are used to obtain omnidirectional transmission, a much less constricting condition than condition [8] is applied so that the use in the method according to the invention of approximations [6] and [7] is generally possible.

Substituting a delay law approaching the initial delay law in the method according to the invention has a great advantage. This is because it limits possible variation of the delay to be applied to the transmit signal to an interval [0; $T_0$] (variation of the phase of the signal between 0 and $2\pi$). This advantageous feature is illustrated by the delay curve 31 shown in FIG. 3 and the phase shift curve 41 shown by the solid line in FIG. 4, these curves relating to the antenna having the directivity pattern illustrated by the curve 11 in FIG. 1.

The method according to the invention consists thirdly in quantizing the delay values obtained for the various projectors making up the antenna. In a preferred way of implementing the method according to the invention, the delay interval [0; $T_0$] is divided into Q equidistant levels. Each projector is then fed with the transmit signal affected with a delay whose value $\tau_i(x)$ is at the quantized value closest to the approximated value $\tau'(x)$. Thus, in the method according to the invention, the delays are therefore quantized over Q states.

According to the invention, the number of quantization levels is such that the fluctuation in bearing of the transmitted level meets the fixed requirements. Thus, for example, for quantization carried out over 16 steps, the expected theoretical fluctuation of the transmitted signal level as a function of the bearing is ±1.5 dB.

The quantization operation, judiciously carried out, has a great advantage. This is because it allows all the projectors, whatever the number of projectors making up the antenna, to be fed with a limited number of Q signals, each signal being derived from the transmit signal by applying a specified delay $\tau_i$ from among the possible Q delays. This limitation by quantizing the possible delay values advantageously allows the number of pairs of conductors needed for feeding all the projectors with signals to be limited to a maximum number of Q pairs. This advantageously limits the complexity of the means responsible for implementing these delays, and also the quantity of conductors to be used and therefore the weight of the antenna feed cable.

Figure 4:
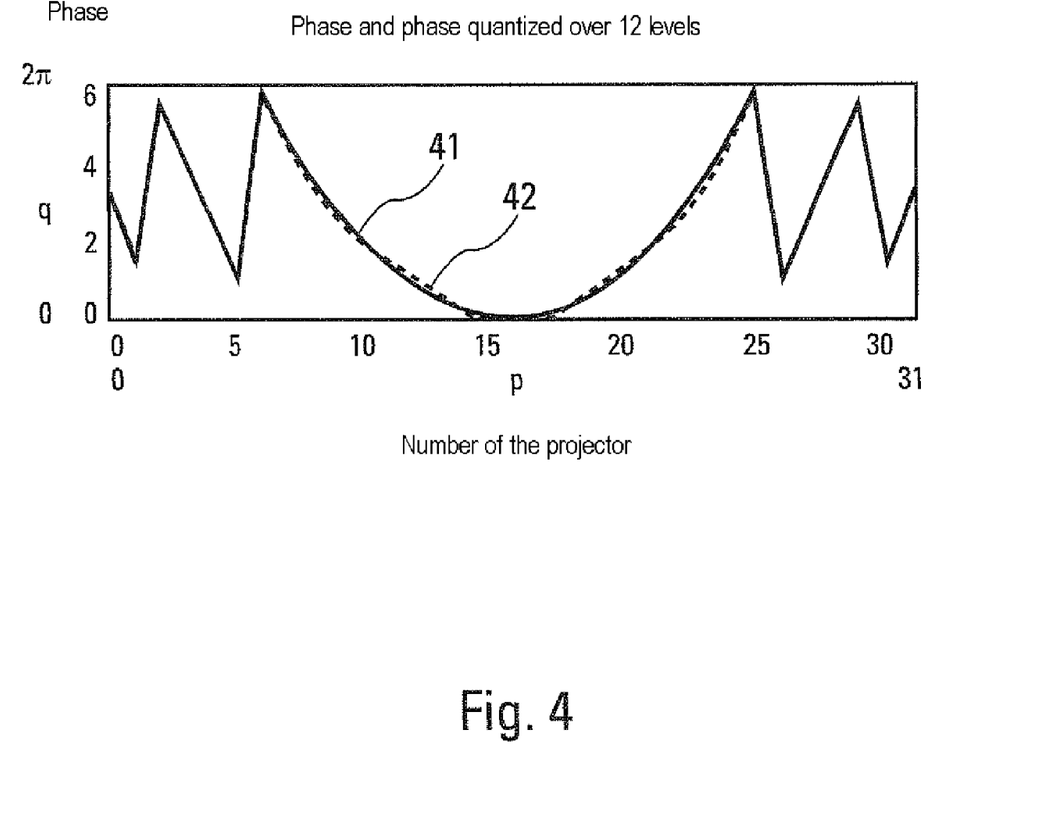
FIG. 4, the laws of variation, continuous or quantized, applied to the phase of the transmission reference signal, corresponding to the law of variation of the delay $\tau(x)$ shown in FIG. 3

The dotted curve 42 in FIG. 4 shows, by way of example, the phase variation law obtained by carrying out the quantization over 12 states of the phase law represented by the curve 41. The fact that the curves 41 and 42 are virtually superposed clearly demonstrates, through this example, the advantageous nature of the quantization step implemented by the method according to the invention, which step is itself only possible after applying the narrow-band approximation to the non-linear law τ(x).

The directivity pattern of the signal obtained by the method according to the invention and transmitted by the antenna is represented by the dotted curve 12 in FIG. 1. The close similarity between this curve and the theoretical curve obtained by applying a non-linear delay law defined by equation [2] also demonstrates the advantageous nature of the method according to the invention.

Thus, implementing the method according to the invention therefore achieves omnidirectional transmission directly by means of a linear antenna comprising a plurality of projectors, by feeding these projectors with only Q feed signals and each of these signals being produced from a common signal by applying a delay (or phase shift) value chosen from the Q values adopted. However, it is advantageous to consider the following point: to modify by a half-period $T_0$ the duration of the delay applied to the common feed signal in order to feed a given projector, all that is required is to reverse the polarity of the signal feeding this projector. This polarity reversal may be easily obtained by switching the feed wires to the terminals of the projector. Thus, the set of Q signals can be obtained by generating Q/2 feed signals coming from the same signal delayed between [0; $T_0$/2] (or phase-shifted between 0 and π), by means of N=Q/2 feed pairs in the cable.

In such a configuration, each pair may feed a different number of transmission transducers, the adaptation being made specifically for the Q/2 corresponding transmitter circuits.

The number Q of feed signals used is not necessarily fixed a priori and does not depend directly on the total number of projectors contained in the antenna. However, analysing the effect on the directivity pattern of the approximations associated with the quantization step indicates that quantizing over a number of delays of the order of Q=10 to 20 values is acceptable. Such a quantization results in the introduction of 5 to 10 feed cable pairs in the towing cable in order to feed all the projectors.

The invention presented here therefore advantageously makes it possible, by judiciously quantizing the delays, to limit, in a rational manner, the number N of feed pairs in the towing cable and to feed as many projectors as necessary for the desired level of omnidirectional transmission.

It should be noted that in directional mode, the weighting is linear and the phase quantization is limited as indicated above (narrow-band approximation) by the condition:

$$L << c/B.$$

However, in omnidirectional mode, with the delay laws defined by equations [2] and [4] that form the subject matter of the present invention, the limitation on the linear antenna length for an omnidirectional mode is less severe. It is given by the following condition:

$$L << (4f/B) \cdot c/B \qquad [9]$$

where f represents the frequency and B the bandwidth of the transmitted signal.

The term 4f/B is necessarily greater than 1 since f>>B and consequently the antenna length limitation is therefore less restricting in the case of omnidirectional transmission than in the case of directional emission. Thus, for example, if a signal with a central frequency of 1.5 kHz and a bandwidth of 300 Hz is transmitted, it is possible to use an antenna having a length that may be up to 100 m. For a signal of the same central frequency but with a 1 kHz bandwidth, it is even possible to use an antenna length limited to 9 meters.

Figure 5:
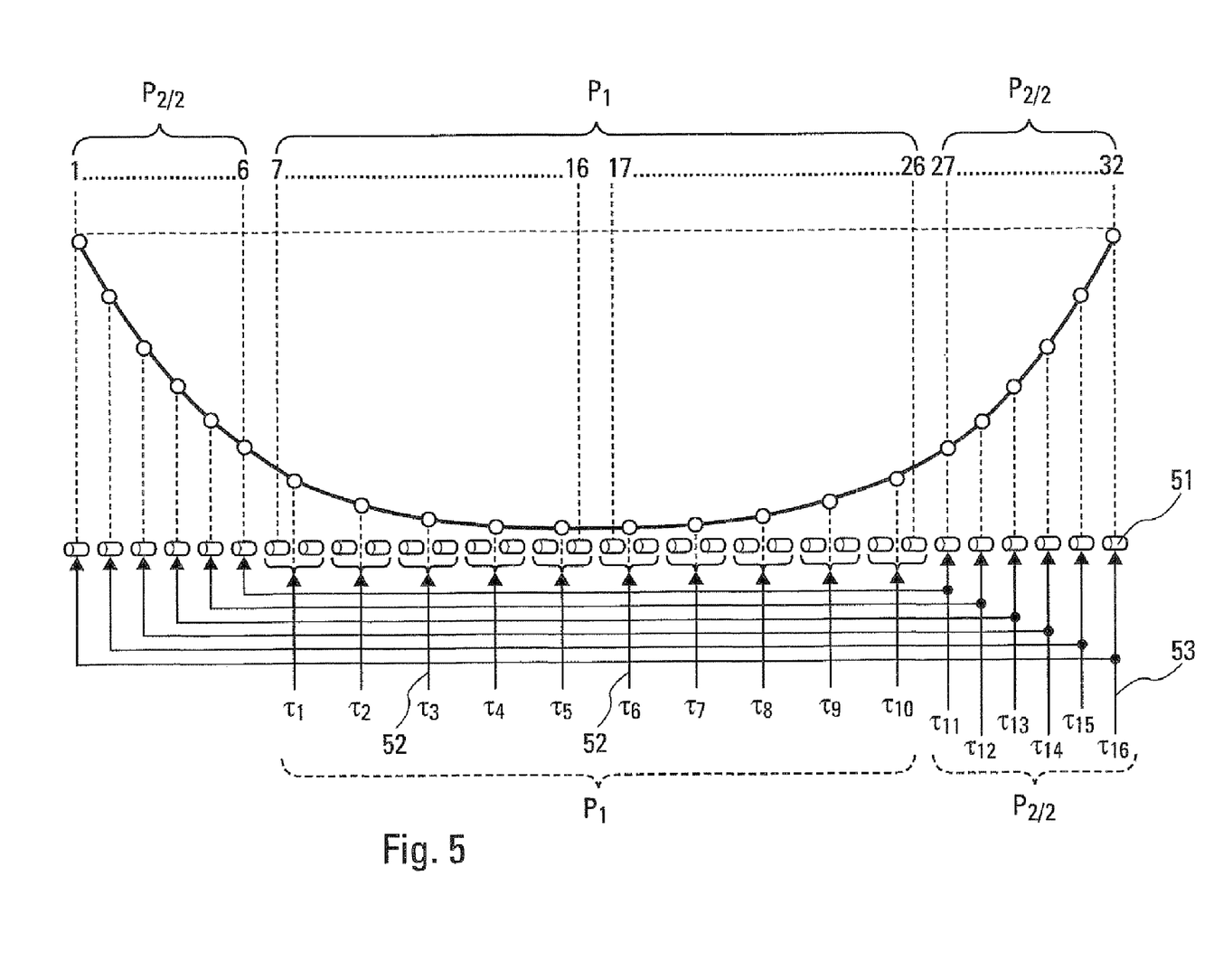
FIGS. 5 and 6, illustrations related to variant ways of implementing the method according to the invention FIGS. 7 to 9, illustrations related to an example of sonar system equipped with an antenna allowing the implementation of the method according to the invention FIG. 10, a particular example of implementing the method according to the invention to achieve an omnidirectional transmission in an horizontal plan.

Next, FIG. 5 will be discussed.

As may be seen in the previous figures, in particular in FIG. 2, in the case of the quadratic delay law τ(x) defined by equation [2], it is at the projectors located on the ends of the antenna that the variation in the delay is most rapid. Consequently, the condition [5], which represents the double constraint of correctly sampling the most rapid delay variations while maintaining a constant spacing between the projectors, must be met for the projectors furthest away from the centre of the antenna.

In contrast, as regards the most central projectors, twice the spacing appears to be acceptable. This observation means that a certain number of projectors in the central zone can be grouped together in pairs, consisting of two adjacent projectors. This pairing advantageously allows the antenna to be fed via a smaller number of feed cable pairs than the number of projectors. Furthermore, it has also been found that, owing to the symmetry of the delay law with respect to the centre of the antenna, it is possible for the symmetrical projectors to be fed via the same pair. It is this advantageous feature that the preferred way of implementing the method according to the invention exploits, one specific example of which is illustrated in FIG. 5.

This example of applying the preferred method of implementation considers an antenna made up of P=32 projectors 51 placed along the antenna with a spacing of about 0.20 m. The central working frequency is here equal to $F_0$=1500 Hz. In the figure, the projectors 51 are numbered from 1 to 32, the centre of the antenna being located between the projectors 16 and 17.

The twenty central projectors, numbered from 7 to 26, are grouped in pairs of adjacent projectors ((7, 8), (9, 10) . . . (25, 26)). Each pair of projectors is fed via a pair of conductors 52. The remaining twelve lateral projectors, numbered 1 to 6 and 27 to 32, are grouped symmetrically with respect to the centre ((1, 32), (2, 31), . . . (6, 27)). Each pair of projectors is also fed via a pair of conductors 53.

One advantage of this type of implementation is that, although the antenna is made up of thirty-two projectors, its signal feed requires only sixteen pairs of conductors. Furthermore, in such an implementation, each pair of conductors is loaded with the same number of projectors (equal to 2).

A variant of the preferred way of implementing the method according to the invention (not illustrated) consists in grouping, in pairs, the pairs of projectors that form the pairwise-grouped projectors of the central region of the antenna. Thus, the projector pairs that are symmetrical with respect to the central point of the antenna are themselves grouped pairwise. Therefore in the above example, the ten pairs of adjacent central projectors are grouped together in symmetrical pairs ([(7, 8), (25, 26)]; [(9, 10), (23, 24)]; etc). Each quad of projectors thus formed is then fed via a pair of electrical conductors so that, in this advantageous variant, it advantageously suffices for five pairs of electrical conductors to feed the central twenty projectors and eleven pairs of conductors for feeding the entire antenna.

As a result, by applying a quadratic delay law quantized over only 11 states to the transmit signal, omnidirectional transmission is achieved by means of a linear antenna.

One advantageous feature of this preferred alternative way of implementing the method according to the invention is that it allows both omnidirectional and directional transmission modes to be used.

This double functionality is for example achieved simply by differentiating the nature of the delay applied to the transmit signal depending on whether it feeds the peripheral projectors or the central projectors.

Thus, if a linear antenna is used that has P equispaced projectors, for example forty-eight projectors, the positioning of which satisfies the condition [5], it is advantageously possible to achieve both sectorial directional transmission and omnidirectional transmission. To do this, an even number $P_1$ of projectors is for example selected, for example twenty projectors, positioned in the central part of the antenna, and these projectors are grouped into $N_1$ ($=P_1/2$) pairs of adjacent projectors that are fed via $N_1$ pairs of independent conductors. The remaining $P_2$ ($=P-P_1$) projectors, twenty-eight projectors in the example in question, are grouped together in twos symmetrically with respect to the centre of the antenna, forming $N_2$ ($=P_2/2$) pairs fed via N ($=Q/2$) additional pairs corresponding to the delays being quantized over Q states, Q being for example equal to 12.

Consequently, to achieve transmission in sectorial directional mode, the $P_1$ central projectors are fed with $N_1$ independent signals according to a delay law $\tau(x)$ defined by equation [1] making it possible to construct a transmission pattern in a given direction, whereas the outer $P_2$ projectors are not used. Likewise, to achieve transmission in omnidirectional mode, all of the P projectors are fed. The central $P_1$ projectors are fed with $N_1$ signals according to a quadratic delay law of the type defined by equation [2], whereas the outer $P_2$ projectors are fed with N signals corresponding to a quadratic delay law quantized over Q delay states $\tau_i$.

Thus, the delay applied in particular to the central projectors may be defined by the following general equation:

$$\tau(x) = \frac{x}{c}\cos\theta + \alpha x^2 \qquad [10]$$

Thus, when $\alpha$ is equal to 0, sectorial transmission directed along the direction $\theta$ is obtained, whereas when $\alpha$ is equal to $2\pi/(\lambda L)$ omnidirectional transmission is obtained.

Next, FIG. 6 will be discussed.

Figure 6:
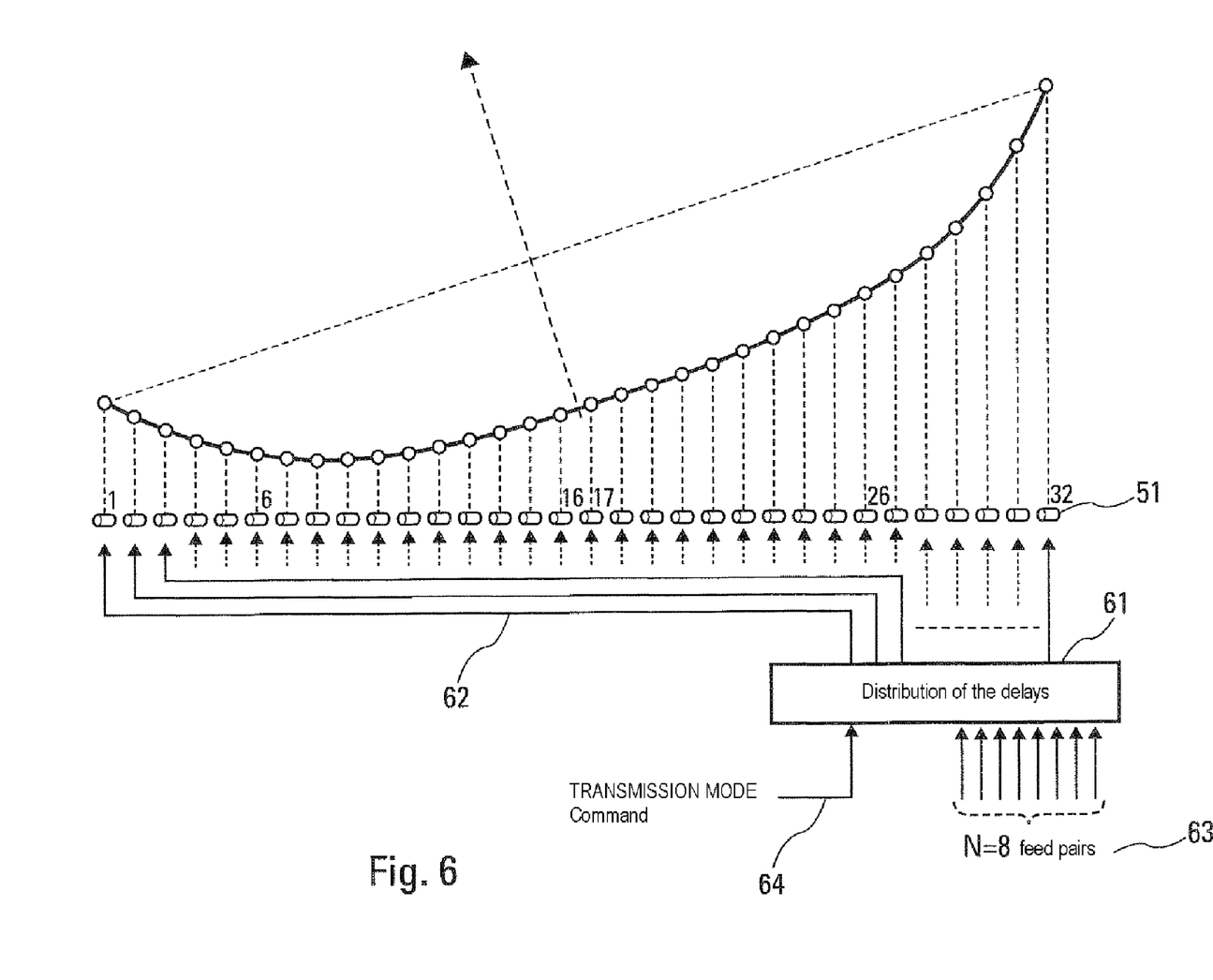

This alternative way of implementing the method according to the invention, illustrated by FIG. 6, is intended more particularly for a sonar system comprising a linear transmit antenna associated with particular switching means 61 for delivering a transmit signal to each projector that depends on the type of transmission desired. In this implementation, advantageously all the projectors are used whatever the transmission mode selected, sectorial or omnidirectional. This allows a maximum transmission level to be achieved. In the linear antenna considered here, each projector 61 is fed via a particular pair of conductors 62, the feed signal applied to this pair being selected by switching means 61 from N feed signals 63 coming from the same transmit signal to which delays determined according to the delay law corresponding to the desired transmission mode are applied.

Thus, in particular, it is possible to obtain:

an omnidirectional mode at maximum level, by applying only a quadratic delay law of the type defined by equation [2];

a sectorial mode at maximum level, by applying a delay law $\tau(x)$ that can be defined by equation [10], the aperture of the transmission sector being produced by the quadratic component of equation [10] and the transmission direction $\theta$ by the linear component function of $\theta$; and an essentially directional mode at maximum level, by applying a delay law $\tau(x)$ that may be defined by equation [1], which describes a linear variation of the applied delay for a given pointing angle $\theta$.

Thus, in the second mode considered here, N feed signals 64 having a delay law according to the desired transmission mode are applied, the N signals being distributed over the projectors by the switching means 61 according to the control signal 64.

Figure 7:
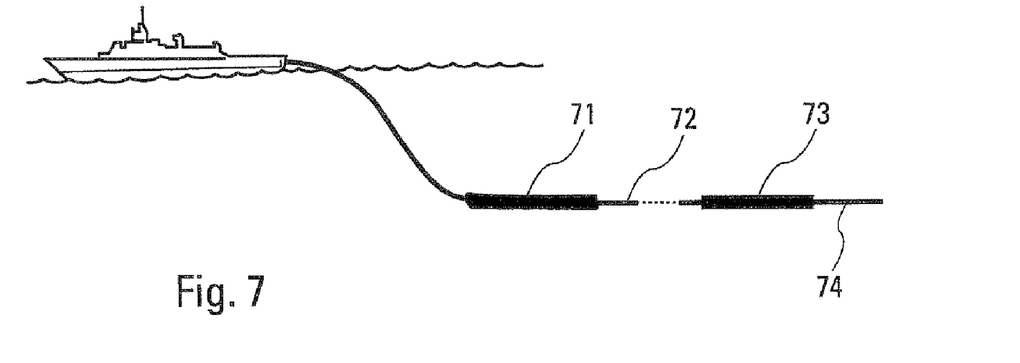
Figure 8:
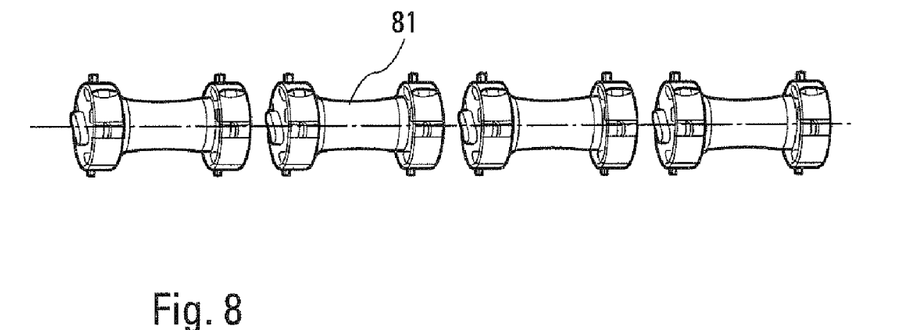
Figure 9:
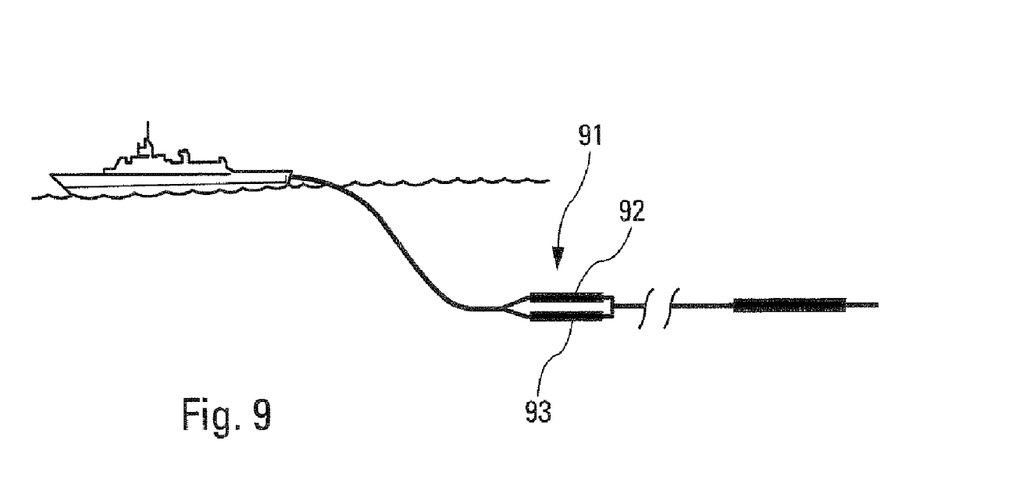

FIGS. 7 to 9 will now be discussed.

FIG. 7 shows schematically an overall view of the antennas with which an example of a sonar system capable of implementing the method according to the invention is equipped. In this system, the linear transmit antenna 71, towed so as to be approximately horizontal, is followed by a lightweight element 72 and a linear receive antenna 73. Apart from the fact that it ensures mechanical connection between the transmit antenna and the receive antenna, the element 72 has the function of distancing the receive antenna 73 from the carrier. The linear receive antenna 73 may, depending on the case, be a simple linear antenna or else a directional antenna comprising triplets of hydrophones. The assembly is completed with a trailing line 74 for automatic deployment without the intervention of an operator using an already sea-qualified method for conventional linear receive antennas.

According to one possible embodiment of the assembly, the transmit antenna may be produced by means of cylindrical flextension projectors 81, such as those illustrated in FIG. 8, the receive antenna being a linear antenna with triplets. The assembly has a substantially constant diameter of possibly less than 100 mm and may advantageously be reeled up on a winch. The transmit sections of larger diameter, 120 or 150 mm for example, may be dealt with by means of memory-type winding systems.

In one embodiment of such a system, illustrated in FIG. 9, it is possible to incorporate a linear transmit antenna 91 formed from at least two vertically superposed antennas 92, 93 implemented using the method according to the invention. Advantageously, this configuration makes it possible, for example within the context of omnidirectional transmission, to minimize the energy transmitted in a vertical plane, both upwards and downwards. The spacing between the transmit antennas 92 and 93 is then typically one half of the average wavelength. This configuration thus advantageously makes it possible to concentrate the energy in a horizontal plane, whatever the transmission direction.

Finally, FIG. 10 will be discussed.

Figure 10:
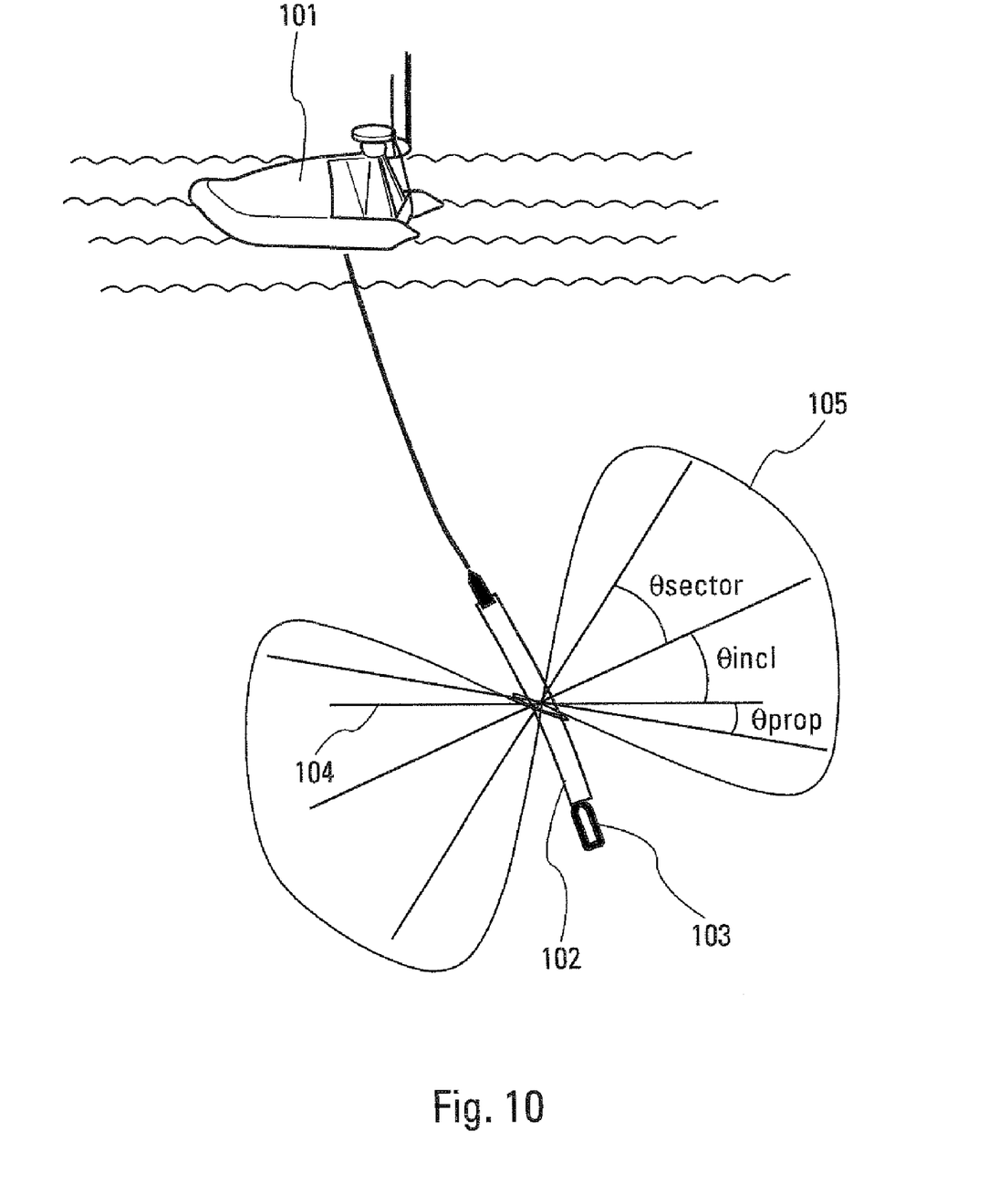

Application of the transmission method according to the invention, illustrated in FIG. 10, consists in transmitting omnidirectionally in a horizontal plane by means of a linear array towed in an inclined position, or even a substantially vertical position. In this application, the method according to the invention is used for sectorial transmission with a variable transmission pattern width by applying a non-linear delay law to the transmit signal. The transmission system thus designed is a reelable small-diameter system that can be operated by a small carrier vehicle 101, possibly autonomous and unmanned, of the USV type for example. It comprises a linear transmit antenna 102, such as that described above, the internal structure of which is optionally weighted, and a heavy reelable tail element 103 for keeping the towed transmit antenna as much as possible in the vertical position, even when the carrier 101 is moving.

Thus, the antenna is considered to make an angle $\theta_{incl}$ to the horizontal, this angle varying with the speed of the carrier 101. Moreover, it is also considered that, depending on the propagation conditions in the medium, good insonification of the water column at great distance requires this insonification to be generated with an angle $\pm\theta_{prop}$ to the horizontal 104. Consequently, if the above two parameters are taken into account and to obtain omnidirectional insonification in a horizontal plane, the width of the insonified sector $\pm\theta_{sector}$ around the perpendicular to the antenna must be permanently adjusted so as to satisfy the following relationship:

$$\theta_{sector} > \theta_{incl} + \theta_{propa} \quad [11]$$

A transmission lobe meeting the above condition, with a substantially constant gain in the directions bounded by the angle $\theta_{sector}$, may advantageously be obtained by the method according to the invention, by applying a quadratic non-linear delay law, this law making it possible in particular to obtain an almost constant transmission level in the insonified sector. The variation 105 of the transmission gain as a function of the angle $\theta$ in question, $\theta_{sector}$, to the omnidirectional level is represented symbolically in FIG. 10. Such a broad transmission lobe obtained by the method according to the invention is advantageously much better adapted to the operational constraints of such a system than a transmission lobe with a narrow −3 dB aperture obtained by means of a linear antenna in which all the projectors are conventionally transmitting at the same time.

Such a transmission system, mounted on a mobile carrier and capable of transmitting even when the carrier is moving, advantageously makes it possible for a wide area to be rapidly insonified and at very different angles. It also makes it easier to locate and classify objects in the area, for example by operating in multistatic receive mode.

Advantageously, it is also possible by applying the method according to the invention in this way to locally insonify a slice of water lying at a shallower depth above the antenna. To do this, all that is required is to immobilize and stabilize the carrier 101 in order to position the antenna 102 vertically and thus make $\theta_{incl}=0°$. In this way it is possible to insonify, a larger slice of water with a higher insonification level of for example 8 dB relative to the level obtained with omnidirectional insonification.

Thus, as may be seen from the various implementations described here by way of non-limiting example, the method according to the invention not only makes it possible to achieve really omnidirectional transmission by means of a linear antenna, but also sectorial transmission for which the width of the transmission pattern is advantageously adapted to the envisaged application. It also allows linear antennas to be designed that can alternate, without any modification of the structure, between sectorial transmission and omnidirectional transmission modes. In certain implementations, the method also makes it possible to very significantly reduce the number of pairs of conductors needed to feed a transmit signal to the projectors making up the linear antenna used.

The invention claimed is:

1. A method for achieving omnidirectional transmission by means of a towed linear antenna of length L greater than the wavelength λ of a signal transmitted, said linear antenna comprising a plurality of P projectors, wherein spacing between the projectors along the linear antenna is substantially less than λ/2, the method comprises:

applying a transmit signal originating from a common transmit signal to each projector, the transmit signal applied to a projector corresponding to the common signal having a delay τ(x) based upon a non-linear symmetric delay law as a function of the position x of said projector along the linear antenna, whereby delay τ(x) allows the angular aperture of the transmission pattern to be modulated.

2. The method according to claim 1, wherein the projectors comprising the antenna are substantially equidistant, by a distance substantially less than λ/2, from one another, the delay applied to the signal as a function of the position x of the projector with respect to the centre of the antenna is a quadratic law of the form:

$$\tau(x) = \alpha x^2$$

wherein α is a coefficient related to an angular aperture of a desired antenna transmission ratter.

3. The method according to claim 1, wherein the projectors are separated from one another by a distance that decreases from the centre towards the extremities, the distance being substantially less than λ/2, the delay law applied to the signal as a function of the position x of the projector with respect to the centre of the antenna is of the form:

$$\tau(x) = \pm \frac{1}{c}[|x| + L\ln(L - |x|)]$$

where c represents the speed of sound in water.

4. The method according to claim 1, wherein a delay τ'(x) applied to the signal is equal to the delay τ(x) modulo a period $T_0$ corresponding to the central frequency of the transmitted signal, the values τ'(x) being quantized over Q levels, from $\tau_1$ to $\tau_Q$.

5. The method according to claim 2, wherein a delay τ'(x) is applied to the signal which is equal to the delay τ(x) modulo a period $T_0$ corresponding to the central frequency of the transmitted signal, the values τ'(x) being quantized over Q levels, from $\tau_1$ to $\tau_Q$.

6. The method according to claim 3, wherein a delay τ'(x) is applied to the signal which is equal to the delay τ(x) modulo a period $T_0$ corresponding to the central frequency of the transmitted signal, the values τ'(x) being quantized over Q levels, from $\tau_1$ to $\tau_Q$.

7. The method according to claim 4, wherein the projectors for which the quantized values $\tau_i$ of the delay differ by $T_0/2$ are fed via the same feed pair, by simply reversing the polarity of the feed wires, the number of pairs of feed wires needed thus being equal to Q/2.

8. The method according to claim 5, wherein the projectors for which the quantized values $\tau_i$ of the delay differ by $T_0/2$ are fed via the same feed pair, by simply reversing the polarity of the feed wires, the number of pairs of feed wires needed thus being equal to Q/2.

9. The method according to claim 6, wherein the projectors for which the quantized values $\tau_i$ of the delay differ by $T_0/2$ are fed via the same feed pair, by simply reversing the polarity of the feed wires, the number of pairs of feed wires needed thus being equal to Q/2.

10. The method according to claim 5, wherein some of the central projectors of the linear antenna are grouped together in pairs of adjacent projectors and the outermost projectors are grouped together in pairs of projectors that are symmetrical with respect to the centre of the antenna, the projectors constituting a pair being fed with the same signal $\tau_i$, these groups making it possible to achieve either sectorial transmission using only the central projectors, or omnidirectional transmission using all of the projectors.

11. The method according to claim 8, wherein some of the central projectors of the linear antenna are grouped together in pairs of adjacent projectors and the outermost projectors are grouped together in pairs of projectors that are symmetrical with respect to the centre of the antenna, the projectors constituting a pair being fed with the same signal $\tau_i$, these groups making it possible to achieve either sectorial transmission using only the central projectors, or omnidirectional transmission using all of the projectors.

12. A linear transmit antenna for implementing the method according to claim 5, the linear transmit antenna comprising projectors, each projector being fed via a specific pair of conductors, and switching means for feeding each of the P projectors making the antenna with N signals, the number N of feed signals, the number N being smaller than the number P of projectors making up the antenna.

13. A transmit linear antenna for implementing the method according to claim 5, the transmit linear antenna comprising two linear antennas that are vertically superposed so as to minimize the energy transmitted upwards and downwards, the two antennas being spaced apart by a distance substantially equal to half the average wavelength $\lambda$, thus making it possible to limit the transmission of energy vertically towards a surface of the sea or the seabed.

14. A transmit linear antenna for implementing the method according to claim 6, the transmit linear antenna comprising two linear antennas that are vertically superposed so as to minimize energy transmitted upwards and downwards, the two antennas being spaced apart by a distance substantially equal to half the average wavelength $\lambda$, thus making it possible to limit energy transmitted vertically towards a sea surface or towards a seabed.

15. An acoustic detection system comprising a directional linear receive antenna and a linear transmit antenna suitable for implementing the method according to claim 5, the linear transmit and receive antennas having substantially the same diameter so that the assembly can be automatically reeled onto a winch.

16. An acoustic detection system comprising a directional linear receive antenna and a linear transmit antenna suitable for implementing the method according to claim 6, the linear transmit and receive antennas having substantially the same diameter so that the assembly can be automatically reeled onto a winch.

17. The system according to claim 15, in which the linear transmit antenna comprises cylindrical projectors of a flextensor type, and the linear receive antenna is an antenna comprising hydrophone triplets.

18. The system according to claim 16, in which the linear transmit antenna comprises cylindrical projectors of a flextensor type, and the linear receive antenna is an antenna comprising hydrophone triplets.

19. A method for achieving omnidirectional transmission in a horizontal plane by means of a towed linear antenna of length L, comprising a plurality of P projectors, the antenna being towed in any navigational position between the horizontal and the vertical, wherein each projector is fed with a transmit signal coming from a common transmit signal to which a delay is applied, the value of said delay following a non-linear law as a function of the position of the projector in the antenna, this law being automatically defined depending on the speed of the carrier, in order to modify the aperture of the insonified sector according to the inclination of the antenna relative to the vertical.

20. The method according to claim 19, in which the non-linear law is defined in order to obtain an aperture angle $\theta_{sector}$ of the transmission pattern that satisfies the condition:

$$\theta_{sector} > \theta_{inci} + \theta_{prop}$$

where $\theta_{inci}$ represents the angle of inclination of the antenna to the horizontal and $\theta_{prop}$ represents transmission direction.

* * * * *